Patented May 26, 1936

2,042,299

UNITED STATES PATENT OFFICE 2,042,299

PAPER MATERIAL CARRYING A RESIN OF PETROLEUM ORIGIN

Carleton Ellis, Montclair, N. J., assignor to Standard Oil Development Company, a corporation of Delaware No Drawing. Application September 24, 1931, Serial No. 564,976

10 Claims. (Cl. 154—40)

This invention relates to paper ply, board, and the like, carrying laminations of water- or moisture-resisting material comprising a resin of petroleum origin, some or all of the paper sheets forming the plies being preferably sized with a similar or analogous resin.

The resin employed herein is one which has a hydrocarbon character and is therefore unsaponifiable. This quality of unsaponifiability is advantageous in paper materials in view of improved stability attained thereby.

Furthermore the resin preferably is obtained by the heat treatment of a petroleum oil which normally is free or substantially free of resins but which by subjection preferably repeatedly to elevated temperatures and especially at high pressures is converted in part into resinous bodies. These resinous substances thus synthesized can then be concentrated by distillation of naphtha and oils present, yielding a tarry product which contains a resin admixed with asphaltic substances and some heavy oily material.

To obtain from this tarry product the resin in a state of considerable purity, that is, substantially free from heavy oils, asphalt and similar contaminations, the tarry product may be subjected to a special distillation, preferably in high vacuum to eliminate the oil. The de-oiled material may then be extracted with a light hydrocarbon solvent of the resin but which has substantially no solvent action on the asphaltic substances. A solution of the synthetic resin quite free of these asphaltic substances thus may be obtained which if desirable may be given an acid and/clay treat and the solvent removed by distillation.

After removal of the solvent there remains a reddish-yellow or reddish-brown resin available for employment in sizing and/or finishing paper, board, and the like, in accordance with the present invention.

As an illustration, gas-oil substantially free of resin, is passed through a heating coil where the oil is heated to about 860°–900° F., under 500–750 pounds superatmospheric pressure, light products of the naphtha type and gases which are formed being removed and the heavier portions being recycled to accomplish repeated exposure to the high temperature, until, by heat reconstitution a high degree of resistance to further change by heating is attained. During this heat treatment some of the hydrocarbons are converted to resin and the resinous bodies thus synthesized dissolved in the resulting tarry oil.

This gas-oil synthetic resin is a fixed, substantially undistillable solid, while the oil in which it is dissolved is capable of undergoing distillation and therefore may be substantially completely removed from the resin. Since the oil has a relatively high boiling point, distillation in high vacuum as previously noted is desirable.

At this point it is appropriate to mention that various crude oils such, for example, as Panuco and Colombian, when subjected to straight run distillation and therefore not exposed to the polymerizing and resinifying heat treatment accorded to the gas-oil procedure illustrated above, do not permit by distillation of adequate separation of resin and oil. The compounds of the majority of crude oils are such that as distillation advances toward the point where only solids (at ordinary temperature) remain in the still, heavier and still heavier and more wax-like oils continue to come over.

By heat-treating to reconstitute as illustrated above, the gas-oil yields a series of hydrocarbons of boiling points ranging gradually upwards to merge or shade finally into the resin stage. Thus, if the stock containing the resin is distilled under vacuum ultimately there will distil a low-softening-point resinous material. There appears to be an increasing tendency for the distillate to become more resinous with progressive rise in temperature, such action having an effect on the softening point of the desired hard resins remaining after distillation. Unless the heat treatment of the oil resulting in the synthesis of the resin is extensive and preferably carried out under high pressure, heavy semi-resinous products may be formed which are not entirely suitable for employment in the making of various grades of papers. The harder resins therefore are generally produced by extensive heat treatment which tends to convert high-boiling polymers that normally would produce resins of low-softening points into resins or semi-resins which permit of the ultimate attainment of paper sizing resins of adequate softening range.

The de-oiled solids are then treated with a resin solvent, preferably a light petroleum naptha which is practically without solvent action on asphaltic bodies. Thus light gasoline, casinghead naphtha, and even somewhat heavier grades of naphtha may be used. Another agent which may be used to effectively keep asphaltic bodies out of solution is liquefied propane or mixtures of liquefied propane and ethane as extraction agents for the resin. Likewise naphtha may be charged with propane and/or ethane under high pressures.

In many cases heating may be required to bring the resin completely into solution and secure a more rapid and thorough extraction from the asphaltic bodies.

After such extraction and filtration or otherwise separating from the asphaltic material, the solution of gas-oil synthetic resin may be given an acid and clay treatment to eliminate traces of asphalt and discoloring bodies.

Evaporation of the solvent yields the solid resin in a state ready to be used in making the various paper products of the present invention.

From the tarry product obtained by the polymerizing and resinifying treatment of the gas-oil described above there may be obtained various yields of the gas-oil synthetic resin but preferably operation is conducted to yield about 10 per cent of this resin based on the tarry material treated.

A grade of gas-oil synthetic resin made in this manner exhibited the following characteristics.

| | |
|---|---|
| Softening point by the ball and ring determination | 180–200° F. |
| Oil boiling under 350° C. (662° F.) and 1 mm. pressure | None |
| Asphaltenes | None |
| Resin | 100% |

Hence an oil-free resin freed from the objectionable discoloring action of asphalt can be obtained in a simple and cheap manner by synthesis from petroleum.

A gas-oil synethetic resin of this character has the very distinct advantages over oil-containing (greasy) resins of high melting point, in its freedom from greasiness and from asphalt discoloration.

Used in paper making as an essential component of the size this hard, oil-free gas-oil synthetic resin is capable of giving to paper the desired crackle or "rattle" when a sheet of paper thus sized is held in the hand and shaken.

Being free from odor and taste when prepared with the characteristics described above in the specific illustration, the resin is adapted for use in wrapping papers employed for certain food products, such as "butchers' wrap".

For incorporation in paper stock the de-oiled and de-asphalted gas-oil synthetic resin preferably is made into emulsion form. Since the resin is unsaponifiable, evidently being composed of true hydrocarbons, it cannot like rosin (used as a paper size) be converted partially to a soap in the manner customary in making rosin size for the paper industry.

Mixtures of the gas-oil synthetic resin may, however, be made with various saponifiable substances such as rosin, oleic, stearic, and other similar fatty acids, likewise acids derived by the oxidation of paraffin wax. These saponifiable materials, singly or in admixture, may be melted with the gas-oil synthetic resin and the product treated with an aqueous alkaline solution, such as one containing caustic soda (sodium hydroxide) or soda ash (sodium carbonate).

The resin mixture and aqueous alkaline solution may be thoroughly agitated in an emulsifying apparatus, preferably heating to a temperature at which the resin mixture softens or melts, and then cooling while continuing the churning or grinding until an emulsion of the proper degree of dispersion is secured. In some cases the mixture, either warm or cold, may advantageously be passed through a colloid mill with or without prior treatment in the emulsifier.

Another agent which may be used as an emulsifying aid is a hydrous clay, such as bentonite. The clay may be ground with the resin and water in the cold to obtain a suspension. Rubber latex (natural or artificial) also may be used.

Whichever means is employed to bring about emulsification, a good emulsion assistant or stabilizer is to be found in several of the soluble salts prepared from sludge acids arising in the refining of petroleum and especially from those derived in the treatment of oil to produce white medicinal oil. These sludges when neutralized with an alkaline material such as soda ash yield certain water-soluble sulphonates that are helpful in maintaining a condition of emulsification of the gas-oil synthetic resin.

In one phase of the invention I seek to prepare emulsions from materials largely or wholly of petroleum origin or available from among the usual supplies of the refinery, such emulsions being adapted for use in the coating and/or impregnation and lamination of paper, paper pulp, jute, burlap and other fibrous materials, webs, sheets, fabrics, rope, and so forth.

As an example of such a composition, paraffin wax is oxidized by blowing with air or oxygen at a temperature usually between 150°–200° C. (302–392° F.) in the presence or absence of catalysts of oxidation, thereby forming a mixture of acids which may be termed paraffinic acids or wax acids. These are suitably purified to eliminate any tar formed in the oxidation. Gas-oil synthetic resin prepared as above is melted with these wax acids using various proportions, ranging from a major to a minor proportion of each, e. g., ratios of 9:1, 8:2, 7:3, 6:4, 5:5, the major constituent in each case being either petroleum resin or petroleum wax acid. The melt then is emulsified with aqueous caustic soda solution and the emulsion stabilized by the addition of a sulphonate, namely, a soluble salt of a sludge acid.

The proportion of emulsified material in the aqueous dispersion may vary greatly, from thick highly concentrated emulsions to thin dilute ones; depending on the purpose for which the emulsion is to be used.

For shipping purposes a concentrated emulsion, that is, having present as little water as possible, is desirable. In other cases I may wish to prepare "dry" emulsions, by which term I mean the ingredients in a dry or substantially dry state or containing the minimum amount of water and of a character adapted to be dispersed on addition of water accompanied by suitable mechanical agitation.

The addition of paraffin wax and/or petrolatum may be made for some purposes, especially for papers which are required to be lighter in color than those produced with the gas-oil synthetic resin as the sole sizing agent.

The gas-oil synthetic resin sizing composition is especially adapted for sizing papers which are of a brownish color such as kraft stock and heavy wrapping stock.

When, however, the gas-oil synthetic resin composition is used to form a water-proofing layer intermediate other layers of paper stock the outer layers of the finished sheet or board may be white or light colored. The presence of a layer of the gas-oil synthetic resin within the sheet is not noticeable, especially if the outer layers are fairly heavy.

The gas-oil synthetic resin is considered of particular value when employed as a water-proofing layer in this way and its manner of application to the paper stock may be carried out by making the emulsion of a spraying consistency and by means of sprayers placed in the paper machine at the point where two or more layers of paper are being formed into webs the surface of one side of one web is sprayed with the emulsion, thereby coating the surface with the gas-oil synthetic resin material. Then as the webs of paper move forward in the paper machine they are pressed together into a coherent sheet with the resin layer forming a lamination. In other words, a layer of the resin thus forms a sandwich, as it were, between two sheets of paper. Since it is frequently customary in paper making to build up very heavy sheets of board by means of three or more layers, the spray application may be applied to more than one layer so that a plurality of laminations of resin will exist in the finished sheet.

Very often a thin sheet of white paper is applied to the surface of a darker colored stock, such white sheet being called a liner, and I may for example form a composite sheet of darker stock containing a single lamination of resin or several such lamellae, one or both sides of the finished sheet carrying a white liner to give it an improved appearance.

An advantage which I consider of great importance arising from the use of this resin in lieu of black substances of the asphalt type is that it is possible to re-use the trimmings and scrap which contain said resin either as a size, lamination or impregnation. It takes only a small amount of paper containing asphalt to ruin the entire batch in a beater, the bulk of which is white or light colored pulp. Therefore asphalted paper as a rule has no value from the standpoint of re-use. In the production of carton stock where a lamination of the gas-oil synthetic resin is desired to serve as a waterproofing layer and to retard to a considerable degree the transmission of moisture, I regard the gas-oil synthetic resin as greatly superior to asphalt for the reasons set forth.

Thus paper may be formed as two-ply, three-ply, etc., with one or more intermediate coats of the gas-oil synthetic resin emulsion. At the same time the paper stock forming the different plies may be sized with the gas-oil synthetic resin or mixtures containing same or any one or more layers of the sheet may be so sized.

In the conduct of this invention it is advantageous to use a petroleum resin which is substantially completely synthetic such as may be obtained by the heat treatment of gas-oil. If crude oil or its fractions containing what may be termed natural petroleum resin is used as a source of the latter, difficulties may arise in the separation of resin from oil and a product not only very dark colored and soft, of low melting point and likely to be sticky results, but also there is danger of sedimentation in the emulsion formed. Hence the preferred form of the invention involves the use of gas-oil synthetic resin free from natural petroleum resin.

In some cases however resins of the latter type may be admixed with the synthetic product in desired proportions, or in other cases, especially when very cheap paper articles are to be produced, the synthetic resin may be omitted altogether provided the softening point of the natural resin is within the desired range with freedom from stickiness, at least to such degree as will not be objectionable in paper products.

It is probable that petroleum resins of generally lower softening points contain influential proportions of high-boiling oil-polymers. By sufficiently prolonged heating especiallly at the higher temperatures and pressures indicated, these fluxing-polymers can be converted in part at least to useful resins and in part eliminated as low-boiling bodies.

Emulsions prepared as above containing the gas-oil synthetic resin may be incorporated in paper in various ways.

(1) As a sizing agent. In this case the gas-oil synthetic resin preferably is added as an emulsion to the paper stock in the beater, although such addition may be made at any time during the progress of the cellulose pulp to the point where it is made into a web of paper. The size may be prepared with alkalies as indicated and substances such as silicate of soda in syrupy form known as water-glass may be employed either with or without other alkaline materials. The emulsion is added to the paper pulp in various proportions, usually 2 or 3 per cent of the gas-oil synthetic resin based on the dry weight of paper being sufficient. After admixture with the pulp the size may be set by the addition of alum, and the like.

(2) Impregnation of porous paper. Emulsions may be made with the gas-oil synthetic resin in such a state of dispersion that impregnation to a considerable extent into the pores of the paper may be secured. For this purpose the porous paper is passed through a bath of the emulsion or is applied to the surface by coating machine and after the paper is dried it is hot calendered.

(3) Laminated paper and board. Here the resin is applied as an intermediate layer or layers, preferably being sprayed or in some cases other coating means may be utilized.

Based on the disclosures above the following procedures may be employed to make the emulsion.

*Procedure 1.*—Churn the molten gas-oil synthetic resin violently with water contaning 25 per cent of bentonite based on the weight of the resin and finish in a colloid mill, or by grinding in the cold.

*Procedure 2.*—Using the gas-oil synthetic resin with 10 per cent of bentonite and 1–5 per cent of the sodium salts of sludge acids, carry out the same treatment as in Procedure 1.

*Procedure 3.*—Add 10 per cent of concentrated water-glass solution to the composition of Procedure 2 and agitate.

*Procedure 4.*—Grind in the dry state gas-oil synthetic resin 100 parts, bentonite 10 parts, sodium salts of sludge acids 10 parts. Add water slowly with grinding until an emulsion of the consistency and concentration desired is secured.

*Procedure 5.*—Melt together gas-oil synthetic resin and rosin, equal parts, and emulsify with an aqueous soda ash solution.

*Procedure 6.*—Melt together gas-oil synthetic resin 100 parts, paraffin wax acids 25 parts and emulsify with aqueous soda ash solution or water-glass solution.

*Procedure 7.*—Gas-oil synthetic resin 100 parts, paraffinic acids 100 parts, sodium salts of sludge acids 10 parts. Emulsify with an aqueous alkaline solution, such as a solution of caustic soda.

*Procedure 8.*—React paraffin wax acids (obtained by oxidation) with triethanolamine and grind into the product a quantity of petroleum resin sufficient to make the ratio of said product and the petroleum resin in the ratio of (A) 1:2; (B) 1:3; and (C) 1:6.

In paper making add as noted above any of the emulsions made by these procedures to the pulp in the beater, Jordan, feed box, etc., the usual proportion when employed as a size being about 2 per cent of gas-oil synthetic resin based on the pulp (dry weight). Higher proportions, however, may be used, for example 5 per cent or even for special sizing purposes as high as 10 per cent. The alkaline compositions are better as additions to the beater than those containing bentonite, as they may be set advantageously by the addition of alum or other salts which form precipitates with silicate of soda or alkalies. Insofar as this part of the procedure is concerned, the operation of setting may be carried out in a manner similar to that employed in the handling of rosin size in paper making.

For impregnation of porous paper, the clay emulsion may be used to add about 10 per cent or so of resin on the weight of the paper, being introduced and the paper subsequently dried and calendered as described above.

For intermediate-layer waterproofing clay emulsions likewise may be used.

Boards of considerable thickness may be prepared by treating two sheets of board on a single face only with the gas-oil synthetic resin emulsion, such application being made by spraying or by the use of a coating machine, the boards then being pressed together, heat being applied if necessary, and calendering if desired.

The heavy oil distillate from the gas-oil synthetic resin in the making of this resin oil-free may be resinified by treatment, for example with naphthalene and aluminum chloride, giving a resin of lighter color than the above specified gas-oil synthetic resin, which synthetic resin may be used in making the above emulsions and forming paper in the manner indicated, such resin being used in lieu of the gas-oil synthetic resin or preferably in conjunction therewith.

Thus the present invention is concerned with paper containing a resin of petroleum origin, preferably synthetic and preferably one generated by heat treatment, derived for example from gas-oil resinification, said resin in preferred form being substantially odorless and substantially tasteless, oil- and asphalt-free, substantially unsaponifible, and possessing a softening point usually lying within the limits of 140–200° F., such preferred form of resin preferably being distributed through the paper sheet or board, wallboard, pressboard, and the like, to function as a sizing agent: the invention also including paper sized with mixtures of such synthetic resin with other substances possessing a sizing or waterproofing action in paper, including paraffinic acids derived by the oxidation of petroleum waxes, also in some cases natural petroleum resins, and the like.

Finally it should be noted that the natural petroleum resins as a class are very dark in color, generally difficult to free from objectionable odors and frequently are so sticky that they would not be suitable for use in the making of various papers; that the moderate heat treatment of petroleum oils, for example at comparatively low pressures and the lower temperatures employed in the earlier history of cracking, yield semi-resinous compositions containing high-boiling oily polymers and that by intensive heat treatment at pressures of several hundred pounds and at temperatures preferably well above 700° F. there can be synthesized hard resins which may be described as "synthetic super-resins of petroleum origin." The present invention is directed especially to the employment of such super-resins either by themselves or admixed with other resins including semi-resins of petroleum origin or the natural petroleum oil resins themselves. In some cases mixtures of all three of these types of resins may be employed.

What I claim is:

1. Laminated paper carrying as a lamination cement a heat-generated synthetic hydrocarbon resin of petroleum origin substantially free from the asphaltenes and oils with which it is associated in petroleum tars.

2. Laminated paper carrying as a lamination cement a gas-oil synthetic hydrocarbon resin of petroleum origin substantially free from asphalt and oil.

3. Laminated paper containing as a lamination cement an odorless, tasteless, oil-free, asphalt-free unsaponifiable synthetic hydrocarbon resin from gas-oil resinification; said resin having a softening point between 180–200° F.

4. Laminated paper containing at the laminations a substantially odorless and substantially tasteless oil- and asphalt-free gas-oil synthetic hydrocarbon resin; said resin having a softening point between 140–200° F.

5. The process which comprises incorporating between layers of paper an emulsion comprising gas-oil synthetic resin.

6. The process which comprises applying to paper a slightly alkaline emulsion comprising gas-oil synthetic hydrocarbon resin and pressing together a plurality of sheets so treated, whereby a laminated product results.

7. The process which comprises spraying paper with a slightly alkaline emulsion comprising gas-oil synthetic hydrocarbon resin and pressing together sheets so treated, whereby a laminated product results.

8. Pressboard carrying as a lamination cement a heat-generated synthetic hydrocarbon resin of petroleum origin substantially free from the asphaltenes and oils with which it is associated in petroleum tars.

9. A laminated product carrying as a lamination cement a hydrocarbon resin of petroleum origin substantially free from asphaltenes, petroleum oils and waxes.

10. A paper product composed of a plurality of sheets of paper bound together by a hydrocarbon resin formed by high temperature, high pressure distillation of petroleum, and substantially free from asphaltenes, petroleum oils and waxes.

CARLETON ELLIS.